United States Patent [19]
Sasaki et al.

[11] Patent Number: 5,558,913
[45] Date of Patent: Sep. 24, 1996

[54] PRIMERLESS PRESSURE-SENSITIVE ADHESIVE CONSTRUCTIONS

[75] Inventors: Yukihiko Sasaki, Claremont; Luigi Sartor, Pasadena, both of Calif.; Yun L. Fu, Dayton, Ohio; Henk de Koning, Zevenhuizen, Netherlands

[73] Assignee: Avery Dennison Corporation, Pasadena, Calif.

[21] Appl. No.: 307,944

[22] Filed: Sep. 16, 1994

[51] Int. Cl.$^6$ ..................................................... B32B 7/10
[52] U.S. Cl. ..................... 428/41.5; 428/41.8; 428/202; 428/212; 428/214; 428/352; 428/354; 428/355
[58] Field of Search .................................. 428/40, 41, 202, 428/212, 214, 352, 354, 355; 427/208.8

[56] References Cited

U.S. PATENT DOCUMENTS

| | | | |
|---|---|---|---|
| 2,652,351 | 9/1953 | Gerhardt | 428/355 |
| 3,285,771 | 11/1966 | Dabroski | 428/352 |
| 3,464,842 | 9/1969 | Jackstadt | 428/40 |

*Primary Examiner*—Nasser Ahmad
*Attorney, Agent, or Firm*—Christie, Parker & Hale, LLP

[57] ABSTRACT

There is provided a laminate of a backing, a layer of permanent pressure-sensitive adhesive and a layer of removable pressure-sensitive adhesive, the latter being in contact with a release surface of a release liner or the opposed surface of the backing. The removable pressure-sensitive adhesive is provided at a coat weight of at least 10 gsm and at coat weight ratio to the permanent pressure-sensitive adhesive of at least 1:1.

9 Claims, 7 Drawing Sheets

Fig. 7  90 DEG ADHESION TO CARDBOARD

Fig. 8  90 DEG ADHESION TO PVC

PRIMERLESS PRESSURE-SENSITIVE ADHESIVE CONSTRUCTIONS

FIELD OF THE INVENTION

The invention relates to removable pressure-sensitive adhesive tape and label constructions.

BACKGROUND OF THE INVENTION

A pressure-sensitive adhesive label constructions comprises a laminate of a facestock or backing, a layer of a pressure-sensitive adhesive and a release liner providing a release surface for the pressure-sensitive adhesive.

In tape constructions, a release is applied to the side of the facestock or backing opposed to the side in contact with the pressure-sensitive adhesive to provide the release surface which enables the facestock and pressure-sensitive adhesive to be peeled away from a contiguous layer of facestock and adhesive.

Pressure-sensitive adhesives (PSA) normally fall into one of two categories, permanent and removable.

Permanent pressure-sensitive adhesives are adhesives which have a level of adhesion which does not allow the removal of the label from the substrate to which it has been applied without considerable damage to a paper facestock such as tearing or for stronger facestocks such as polyester, suffering failure at the facestock, cohesive failure in the body of the adhesive or leave a significant amount of adhesive on the substrate.

The adhesion of removable pressure-sensitive adhesives is considerably lower, allowing removal of the facestock or label with adhesive from the substrate even after a protracted period of contact. Removal is without significant damage to the facestock or substrate. Typically, a removable pressure-sensitive adhesive will have a bond of about 50 to about 300 N/m to stainless steel.

The limitation on the use of removable pressure-sensitive adhesives for the tape and label constructions is that a primer is needed to enable adequate anchorage to the facestock and, for some removable pressure-sensitive adhesives, to prevent staining of paper facestocks.

Traditionally the primer has been deposited as a barrier coat from a solution of a polymer in an organic solvent such as toluene. Ethylene-vinyl acetate and styrenic polymers both filled and unfilled have been employed.

Environmental considerations, however, have mandated a reduction in the amount of solvent employed in industry.

Aqueous, emulsion-based primers for facestocks have been tried as replacements, but impart curl to a paper facestock. Curl can be removed by remoisturizing the paper but at an additional cost. Many papers, moreover, have a glossy surface and remoisturization reduces gloss and the quality of the product is adversely affected. This is not acceptable in industry.

In addition, many coaters do not have a primer-coating station or an oven to dry the primer coat. It would be desirable, therefore, to provide an alternate route to providing removable pressure-sensitive adhesive constructions which would not involve the use of solvent-based primer systems.

Dual and multiple die coatings on substrates are well known in the art and described for instance in U.S. Pat. No. 3,573,965 incorporated herein by reference.

U.S. Pat. No. 4,260,659 to Gobran, incorporated herein by reference, describes a multilayer pressure-sensitive adhesive tape formed of a plurality of superimposed pressure-sensitive adhesive strata the outer strata of which being significantly softer than the strata immediately underlying it.

U.S. Pat. 4,854,259 to Kuller, incorporated herein by reference, describes a process for producing a pressure-sensitive adhesive tape comprising a plurality of concurrently coated superimposed layers, at least one outer layer of which being a pressure-sensitive adhesive layer, with contiguous layers defining an inner phase therebetween each layer comprising a photo polymerized matrix of polymer chains extending from matrix of one layer through the interface to the matrix of a contiguous layer. As consequence thereof, the layers cannot be delaminated.

Figure 1:
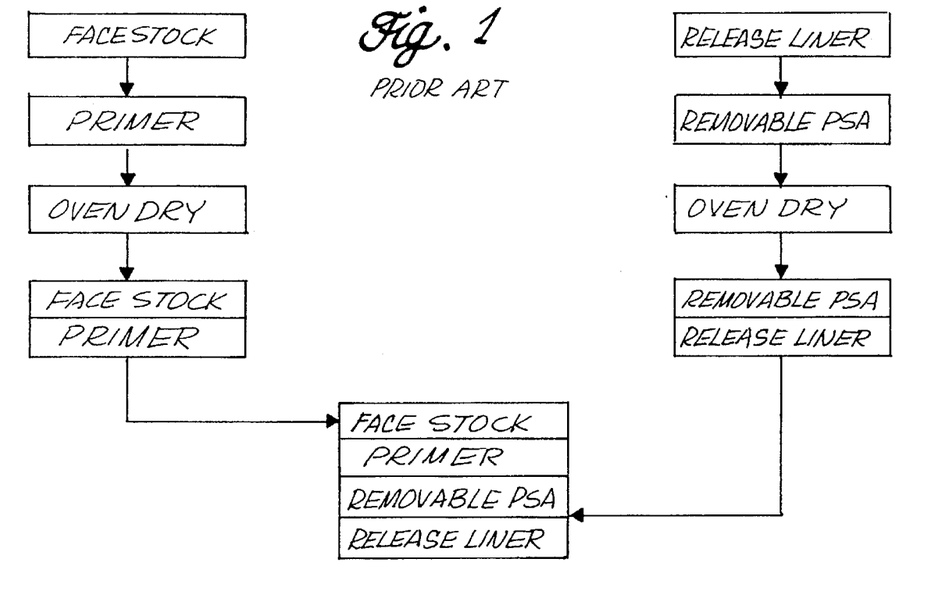
FIG. 1 shows, in block diagram, the current method of manufacture of a removable pressure-sensitive adhesive label stock construction.

The current method of manufacture of a removable pressure-sensitive adhesive label stock is depicted in FIG. 1. With reference thereto a facestock or backing web is coated with a primer from a solvent and oven dried to form a web of primed backing. Contemporaneously, a web of release liner is coated with a removable pressure-sensitive adhesive, which is oven dried. The laminate of removable pressure-sensitive adhesive and the release liner is combined with the formed primed facestock to form a final laminate of facestock, primer, removable pressure-sensitive adhesive and release liner. It is also feasible to apply the removable PSA directly to the primer and laminate that subassembly to the release liner. For tape constructions the release liner is eliminated and a release agent is applied to the surface of the backing opposed to the surface in contact with the removable pressure-sensitive adhesive.

This is a multi-step and costly process and it would be desirable to make the construction of removable pressure-sensitive adhesive product less costly without jeopardizing the performance of the removable pressure-sensitive adhesive. This is the subject of the instant invention.

SUMMARY OF THE INVENTION

It has now been found that tape and label constructions based on the use of removable pressure-sensitive adhesives can be formed by use of a permanent pressure-sensitive adhesive in place of the primer as an anchor and a barrier layer for securing a removable pressure-sensitive adhesive layer to a backing. The combination may also be used to adjust adhesion to any levels between the adhesion of the permanent pressure-sensitive adhesive and the adhesion of the removable pressure-sensitive adhesive.

The construction comprises a web of backing or facestock in contact with a layer of a permanent pressure-sensitive adhesive which is in turn in contact with a layer of a removable pressure-sensitive adhesive. The removable pressure-sensitive adhesive is in turn in contact with either a release surface of a release liner or a release surface on the opposed surface of the backing.

In order to retain removable pressure-sensitive properties, it is necessary to limit the relative amount of permanent pressure-sensitive adhesive employed. For a typical total pressure-sensitive adhesive coat weight of 18–25 grams per square meter (gsm herein), the coat weight of the removable pressure-sensitive adhesive coat is at least about 50% of the gsm and the coat weight ratio of removable pressure-sensitive adhesive layer to permanent pressure-sensitive adhesive layer is at least about 1:1, more preferably about 3:1, still more preferably about 4:1 or more. At higher coat weight levels of permanent adhesive, e.g., about 50% of the coat thickness, the adhesivity approaches that of the permanent pressure-sensitive adhesive. The layers of removable and permanent pressure-sensitive adhesives are expeditiously applied to a web of facestock by co-extrusion from a dual die of respective removable and permanent pressure-sensitive adhesives from emulsions onto the release liner or the backing, drying the layers and laminating the subconstruction to a backing or release surface. Simultaneous dual layer coating eliminates many operating steps and significantly reduces the cost of tape and sheet stock construction. The total coating thickness and thicknesses of each layer are controlled by metering of the amount of permanent and removal pressure-sensitive adhesives discharged from each orifice of the dual die.

BRIEF DESCRIPTION OF THE DRAWINGS

Attached

DETAILED DESCRIPTION

The present invention is directed to tape and label constructions employing removable pressure-sensitive adhesives in which the layer of removable pressure-sensitive adhesive is adhered to a layer of permanent pressure-sensitive adhesive, which is in turn adhered to the facestock or backing.

Figure 2:
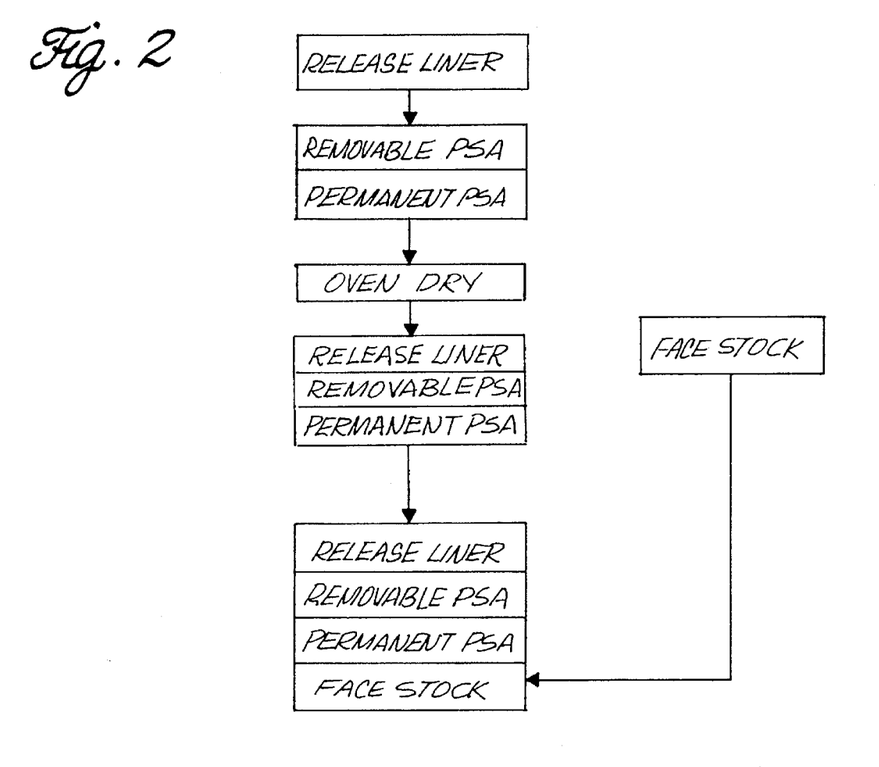
FIG. 2 illustrates, in block diagram, the method of manufacture of a removable pressure-sensitive adhesive label stock construction according to the instant invention.

Pressure-sensitive adhesive constructions of the invention, when for label applications, are, with reference to FIG. 2, preferably prepared by coating a layer of permanent and removable pressure-sensitive adhesives (PSA) onto a silicone release liner using a dual die. The adhesives employed are emulsion pressure-sensitive adhesives and are simultaneously pumped through adjacent orifices of the die and coated onto the release liner. The laminate of the release liner, the removable pressure-sensitive adhesive and permanent pressure-sensitive adhesive is then passed through an oven to dry them. Temperature is about 180° F. Following drying, the laminate of the release liner, removable pressure-sensitive adhesive and permanent pressure-sensitive adhesive are laminated to a web of facestock or backing.

While not shown, if the release liner is eliminated, as in the case of tape manufacture, then the layers of permanent pressure-sensitive adhesive and removable pressure-sensitive adhesive are dual die-coated onto one side of a web of paper to be slit and the reverse side is coated with a suitable release material to provide a release surface. The formed laminate of paper, permanent sensitive adhesive and removable pressure-sensitive adhesive is then wound into a roll for slitting into tapes. The construction made according to FIG. 2 is normally processed and cut into labels with or without matrix removal. It will be appreciated further that the entire process of FIG. 2 could be reversed and the layers of removable and permanent pressure-sensitive adhesive could be applied by a dual die directly to the facestock, oven dried and then laminated to the release liner. Both the emulsion removable pressure-sensitive adhesive and the emulsion permanent pressure-sensitive adhesive employed in the practice of the invention should be of a viscosity sufficient that the dual cast layers of removable and permanent pressure-sensitive adhesives will not significantly diffuse at their interfaces. This insures that the properties of the permanent pressure-sensitive adhesive will not, unless desired, adversely impact the properties of the removable pressure-sensitive adhesive. They must be, however, mutually compatible to allow co-casting of discrete layers which will not delaminate.

In general, to achieve a removable pressure-sensitive adhesive, the coat weights of the combination of layers of permanent and removable pressure-sensitive adhesives will be about 18 to about 25, preferably about 20 to about 23 gsm, with at least 50% of the coat weight being the removable pressure-sensitive adhesive. It is preferred, however, that the relative coat weights in gsm of the removable to permanent pressure-sensitive adhesives be at least about 1:1, preferably about 3:1, and more preferably about 4:1 or more. This allows for use of the least amount of permanent pressure adhesive and provides a coat of removable pressure-sensitive adhesive in contact with the coat of permanent pressure-sensitive adhesive with the minimal influence of the permanent pressure-sensitive adhesive on the properties of the removable pressure-sensitive adhesive.

At permanent pressure-sensitive adhesive thicknesses above about 50% of total thickness, the influence of the permanent pressure-sensitive adhesive becomes significant and the level of adhesion builds significantly. This effective allows use of relative thicknesses of removal and permanent adhesives to control adhesion to substrates.

The pressure-sensitive adhesives employed in the instant invention may be any emulsion acrylic or rubber resin removable and permanent pressure-sensitive adhesives that are sufficiently compatible to form two discrete layers with minimal diffusion between layers. In the construction, the permanent pressure-sensitive adhesive will have enough aggression to the facestock to preferentially bond the removable pressure-sensitive adhesive to the facestock as opposed to allowing adhesive transfer to normal substrates. These include paper, recyclable cardboard, polyolefins, polyvinyl chloride, glass, stainless steel, painted surfaces and the like. In sum, the layer of permanent pressure-sensitive adhesive serves to aggressively anchor the removable pressure-sensitive adhesive to the backing, and when the backing is paper, provide a barrier which prevents paper staining.

The use of a permanent pressure-sensitive adhesive layer sandwiched between the removable pressure-sensitive adhesive layer and facestock can be used to make a variety of constructions. For instance, the permanent pressure-sensitive adhesive layer may be a repulpable pressure-sensitive adhesive and the removable pressure-sensitive adhesive layer may be repulpable or non-repulpable. In either event using a repulpable permanent pressure-sensitive adhesive layer can enable separation from a paper facestock as part of the stock recovery. More significantly, the permanent pressure-sensitive adhesive can be tailored to the nature of the facestock while the removable can be selectively tailored to the nature of the substrate to which the construction is designed to be applied.

The preferred removable pressure-sensitive adhesive compositions comprise an acrylic-based emulsion polymers which exhibit low peel adhesion, preferably on the order of about 50 to about 300 N/m on stainless steel.

The acrylic-based emulsion polymers for removable and permanent pressure-sensitive adhesive comprise from about 75 to about 98% by weight acrylic acrylate monomers preferably about 85 to about 98% by weight. Amounts of alkyl acrylate monomers below 85% are not presently preferred except as part of a repulpable pressure-sensitive adhesive because the resultant glass transition temperature of the adhesive may to be too high and the adhesion loses tack. Polymers having more than about 98% alkyl acrylate monomers are not preferred because the polymers tend to exhibit insufficient cohesive strength and leave stains or residue when peeled away from substrates. An amount of from about 85% to about 98% by weight alkyl acrylate monomers is presently preferred for the removable pressure-sensitive adhesives.

The alkyl acrylate monomers preferably contain from 1 to about 12 carbon atoms in the alkyl chain and more preferably the alkyl acrylate monomers contain from about 4 to about 8 carbon atoms in the alkyl chain.

Diesters of alpha, beta unsaturated dicarboxylic acids may also be beneficially used especially for the permanent pressure-sensitive adhesives.

For removability, polymers with at least the majority of the alkyl acrylate monomers having from about 4 to about 8 carbon atoms in the alkyl chain are presently preferred as providing the optimum balance of hardness, adhesion and removability. Exemplary alkyl acrylates suitable for use in the present invention include 2-ethylhexyl acrylate, butyl acrylate, heptyl acrylate, octyl acrylate, isooctyl acrylate, and isobutyl acrylate. Butyl acrylate and 2-ethylhexyl acrylate are presently preferred.

Up to about 15% of the emulsion polymer monomer may be a hard monomer. Preferred hard monomers include vinyl acetate, styrene, methyl methacrylate and vinyl pyrrolidone.

The polymer composition may comprise up to about 25% of a polar monomer or blends of polar monomers to impart mechanical stability and cohesive strength or repulpability to the polymer. The term "polar" monomer there, is meant organic carboxyl acids, amides and alcohols. Examples of polar monomers include methacrylic acid, acrylic acid, itaconic acid, maleic acid, acrylamide, methacrylamide, 2-hydroxy ethyl acrylate and the like.

The polymer may comprise up to about 1% by weight of an internal cross-linking agent. The term "internal crosslinking agent" is meant to include polyfunctional compounds having at least two non-conjugated carbon-carbon double bonds per molecule which agent becomes part of the polymer during polymerization. It has been found that the amount of internal crosslinking agents should not exceed about 1%, as amounts greater than 1% tends to reduce stability of the acrylate-based emulsion from which the polymers are prepared. This results in coagulation of the emulsion particles during preparation. An amount of the internal crosslinking agent above about 0.3% are not preferred as no additional benefit is typically observed. Examples of suitable internal crosslinking agents include diallyl maleate, diallyl phthalate and multifunctional acrylates and methacrylates including polyethylene glycol diacrylate, hexanediol diacrylate, ethoxylated trimethylolpropane triacrylate, pentaerythritol triacrylate, propylene glycol diacrylate and trimethylolpropane trimethacrylate.

The polymer systems may further comprises an external cross-linking agent which causes post polymerization crosslinking in an amount up to about 2% by weight, and preferably from about 0.1 to about 0.7% by weight. External cross-linking agents include metal salts such as zirconium ammonium carbonate, zinc ammonium carbonate, aluminum acetate, zinc acetate and chromium acetate. Amounts of external crosslinking agent greater than about 2% are generally not employed because of undesirable loss of adhesion.

The presently preferred removable acrylic pressure-sensitive adhesives are adhesives containing adhesive polymers formed from a blend of about 98% by weight 2-ethyl hexyl acrylate or isooctyl acrylate and about 2% by weight carboxyl acids in particular, acrylic and methacrylic acids.

The permanent pressure-sensitive adhesives which serve as anchoring agent between the removal pressure-sensitive adhesive layer and the backing of facestock are preferably high performance acrylic-based pressure-sensitive adhesive which contain greater amounts of polar monomers. Aggressiveness can also be enhanced by use of a tackifier. Some of such pressure-sensitive adhesives are described in U.S. Pat. No. 5,164,444 incorporated herein by reference and generally contain from about 35 to 60% by weight of at least one alkyl acrylate, about 15 to 35% of at least one vinyl ester, about 20 to 40% by weight of a diester of a dicarboxylic acid, preferably di-2-octyl maleate or di-2-ethyl hexyl fumarate and about 3% by weight of unsaturated carboxylic acid.

In the ensuing Examples and Controls, R-1 is a removable pressure-sensitive adhesive deposited from a high viscosity emulsion of an acrylic co-polymer formed of 98% by weight 2-ethyl hexylacrylate and 2% by weight of a mixture of acrylic and methacrylic acids. The emulsion utilizes an anionic surfactant. Solids content is 66 to 65% and the emulsion thickened with a organic thickener. R-2 is the same emulsion as R-1 but without the thickener. R-3 is a 61–63% solid emulsion of a plasticized copolymer of 98% 2-ethyl hexylacrylate and 2% by weight of a mixture of acrylic and methacrylic acids. P-1 is a tackified acrylic emulsion copolymer formed in the presence of an anionic surfactant. P-2 is an emulsion polymer formed of 2-ethylhexyl acrylate/di-2-octyl maleate/vinyl acetate/acrylic acid/methacrylic acid in relative weight ratios of 48/29/21/1.5/0.5 and formed in the presence of dodecyl mercaptan.

Examples 1 and 2 and Controls 1 to 5

There was provided for purposes of evaluation of the invention an emulsion of a permanent pressure-sensitive adhesive. P-1 and emulsions of removable pressure-sensitive adhesives, R-1 and R-2. The adhesives were cast onto vellum using a dual die and dried to form a laminate of vellum, permanent pressure-sensitive adhesive and removable pressure-sensitive adhesive. These laminates are Example 1 (Ex-1) and Example 2 (Ex-2). These constructions were compared to a commercial removable construction (Control 1), two constructions in which R-2 was cast onto primed vellum (Controls 2 and 3), a construction where R-1 was cast onto unprimed vellum (Control 4) and one where R-2 was cast onto unprimed vellum (Control 5). Coat weights for each construction is shown in Table 1.

TABLE 1

|  | P1 | R1 | R2 | R100(a) | primer |
|---|---|---|---|---|---|
| Cont1 | — | — | — | 20 | N/A |
| Cont2 | — | — | 20 | — | N/A |
| Cont3 | — | — | 20 | — | N/A |
| Cont4 | — | 20 | — | — | — |
| Cont5 | — | — | 20 | — | — |
| Ex1 | 4 | 16 | — | — | — |
| Ex2 | 4 | — | 16 | — | — |

R100(a) is the commercial solvent-based removable.
N/A = unknown

Figure 3:
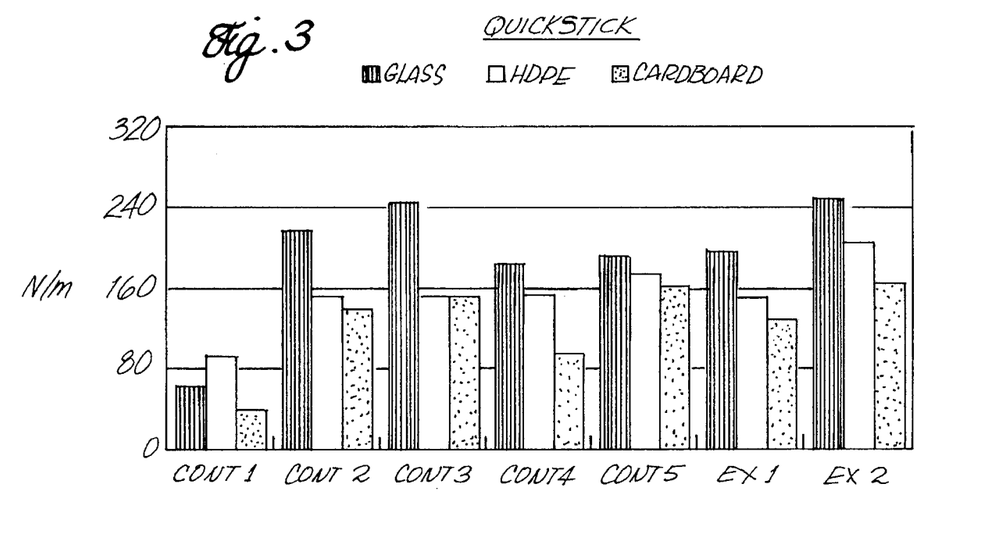
FIG. 3 shows quickstick to glass, high-density polyethylene (HDPE) and recycled cardboard using the compositions of the instant invention and Controls 1 to 5.
Figure 4:
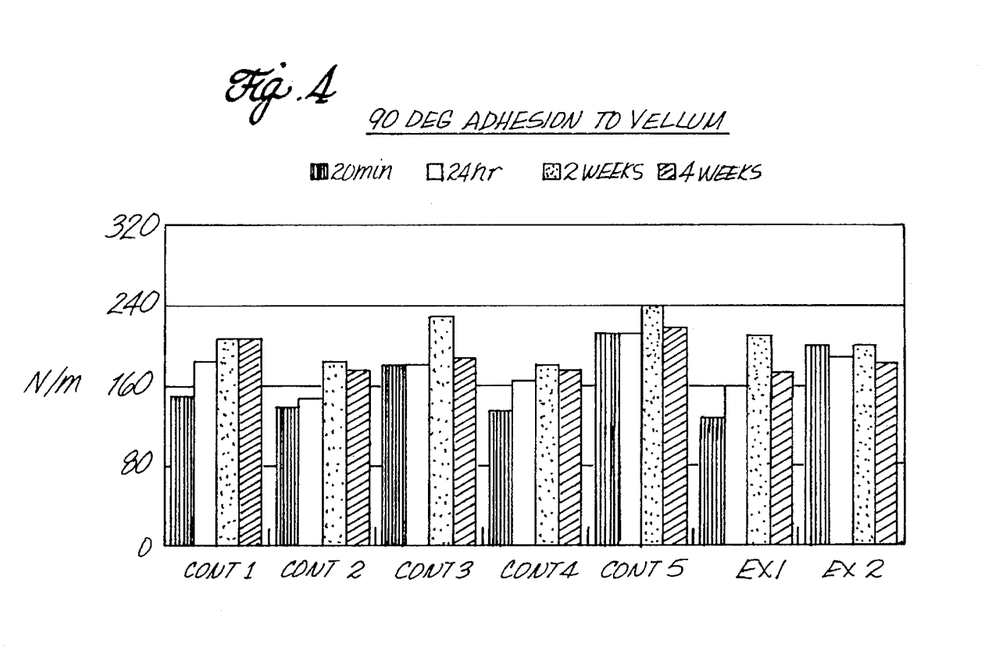
FIGS. 4, 5, 6, 7 and 8 shows 90° peel adhesion to vellum, glass, high density polyethylene (HDPE), cardboard and polyvinyl chloride (PVC) as a function of time for compositions of the invention as compared to Controls 1 to 5.
Figure 5:
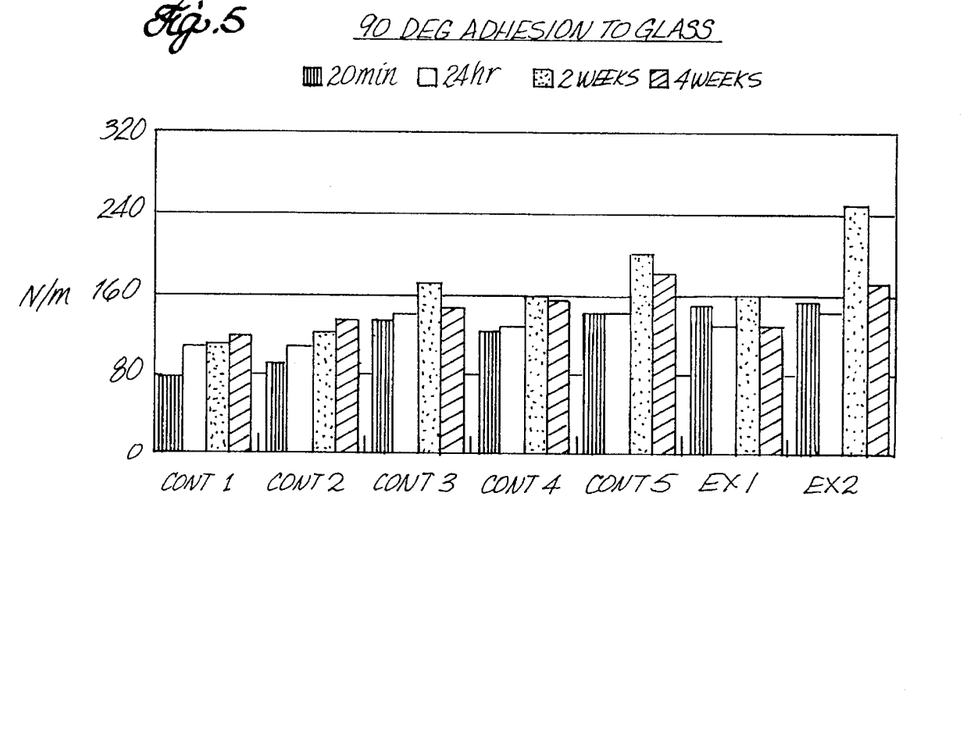
Figure 6:
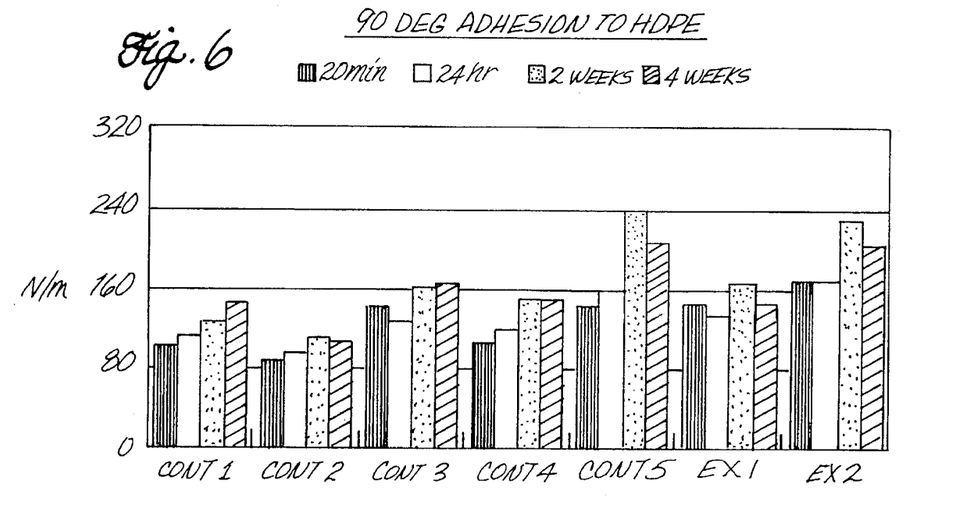
Figure 7:
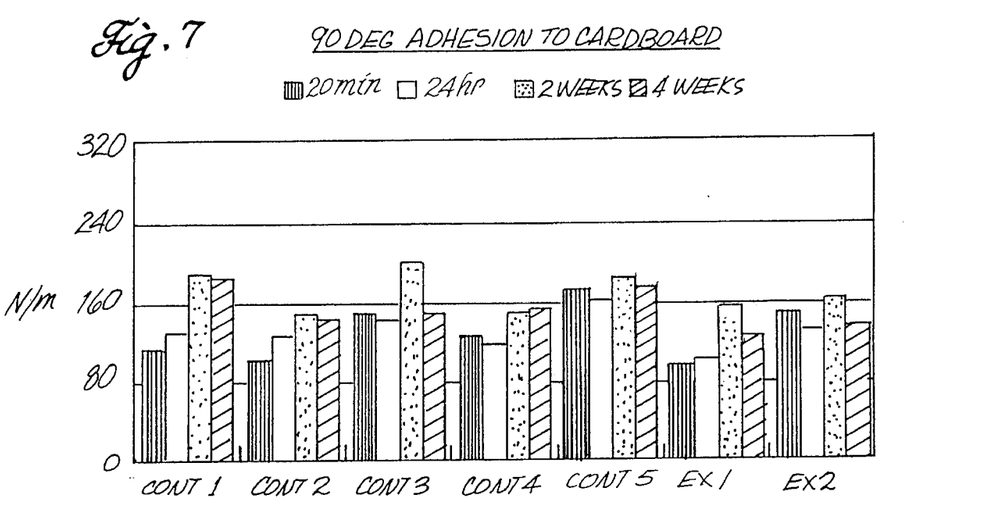
Figure 8:
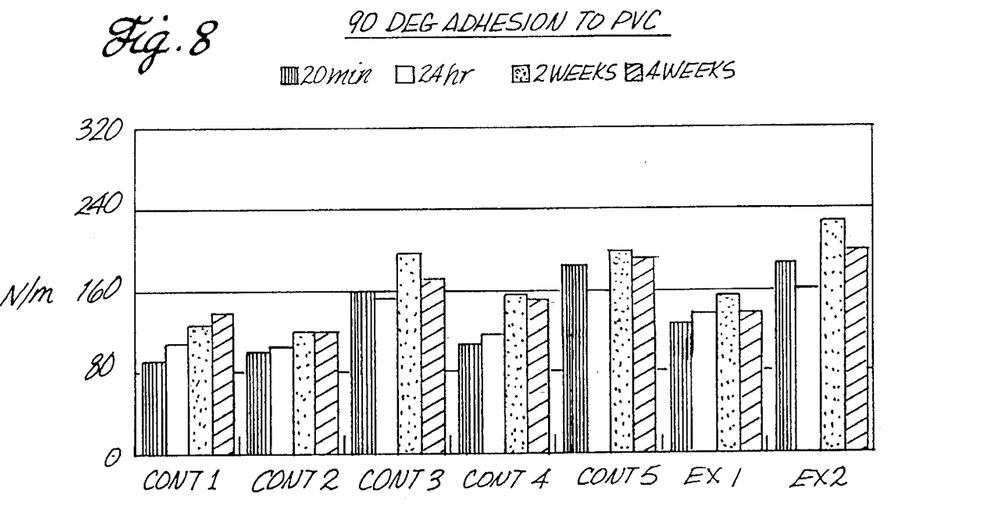

Adhesion performance of the constructions were evaluated for quickstick to various substrates (FIG. 3), 90° adhesion to vellum (FIG. 4), 90° adhesion to glass (FIG. 5), 90° adhesion to high density polyethylene (FIG. 6), 90° adhesion to cardboard (FIG. 7), and 90° adhesion to polyvinyl chloride (PVC) (FIG. 8). Removability was evaluated under natural aging conditions (23° C. at 50% relative humidity with up to one month in various substrates). On vellum and cardboard, FIGS. 5 and 7, three of the constructions, Controls 4 and 5 and Example 2, failed, with adhesive transfer occurring almost immediately after application (20 minutes). This occurred when the R-2 adhesive was coated without using a primer and when there was employed a laminate of R-2 on P-1. On glass, high density polyethylene and polyvinyl chloride adhesive transfer was observed for the unprimed constructions (Cont 4 and 5) after two weeks. The other R-1 constructions gave good removable properties. The best properties were seen for the pre-primed vellum base stock for dual die-coated material prepared using R-1 on a thin (4 gsm) layer of P-1. Results of this study established that it was feasible to prepare a removable adhesive using a dual die-coating system where the primer coat was replaced by a permanent pressure-sensitive adhesive coat which was simultaneously deposited on top of the removable pressure-sensitive adhesive onto a release surface and then transferred to vellum. This is the construction of Examples 1 and 2. It also became clear that the R-2 adhesive gave unacceptable properties when coated without using a primer and, when cast using a dual die with a permanent adhesive gave too aggressive an adhesion, possibly because of some mixing of the permanent adhesive with the removable adhesive when cast with the dual die and possibly due to the permanent adhesive achieving too high an effective thickness. Differences may also be attributable to the fact that the apparatus was different from that used to cast the composition of Example 1. In any event, the study confirmed that it was feasible to use a dual die technique to cast a laminate of a permanent pressure-sensitive adhesive and a removable pressure-sensitive adhesive to get proper bonding to a facestock or backing so as to retain the properties of the removable pressure-sensitive adhesive and its aggressive bond to a backing.

Controls 6, 7, 8 and 9 and Examples 3 and 4

Figure 9:
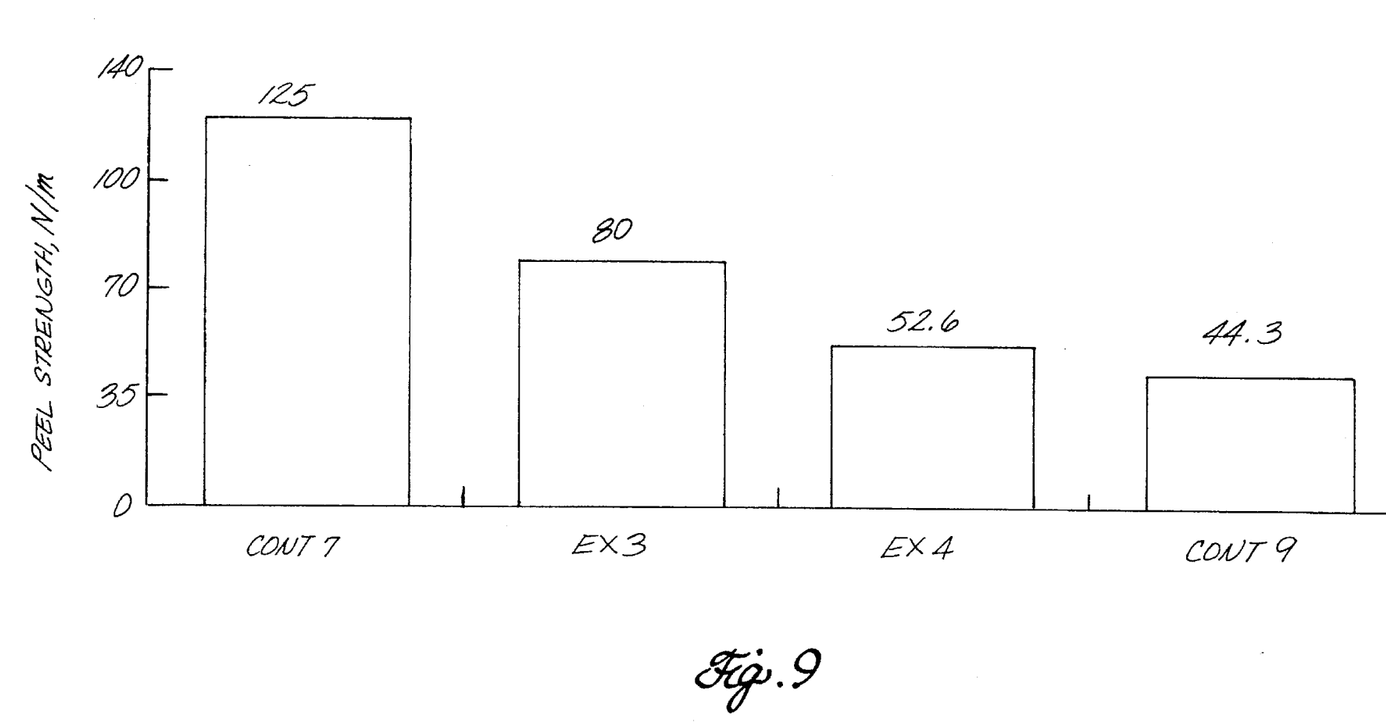
FIGS. 9 and 10 show, respectively, 90° peel and loop tack values to stainless steel as a function of relative coat weight in comparison to a commercial product which is Control 9.
Figure 10:
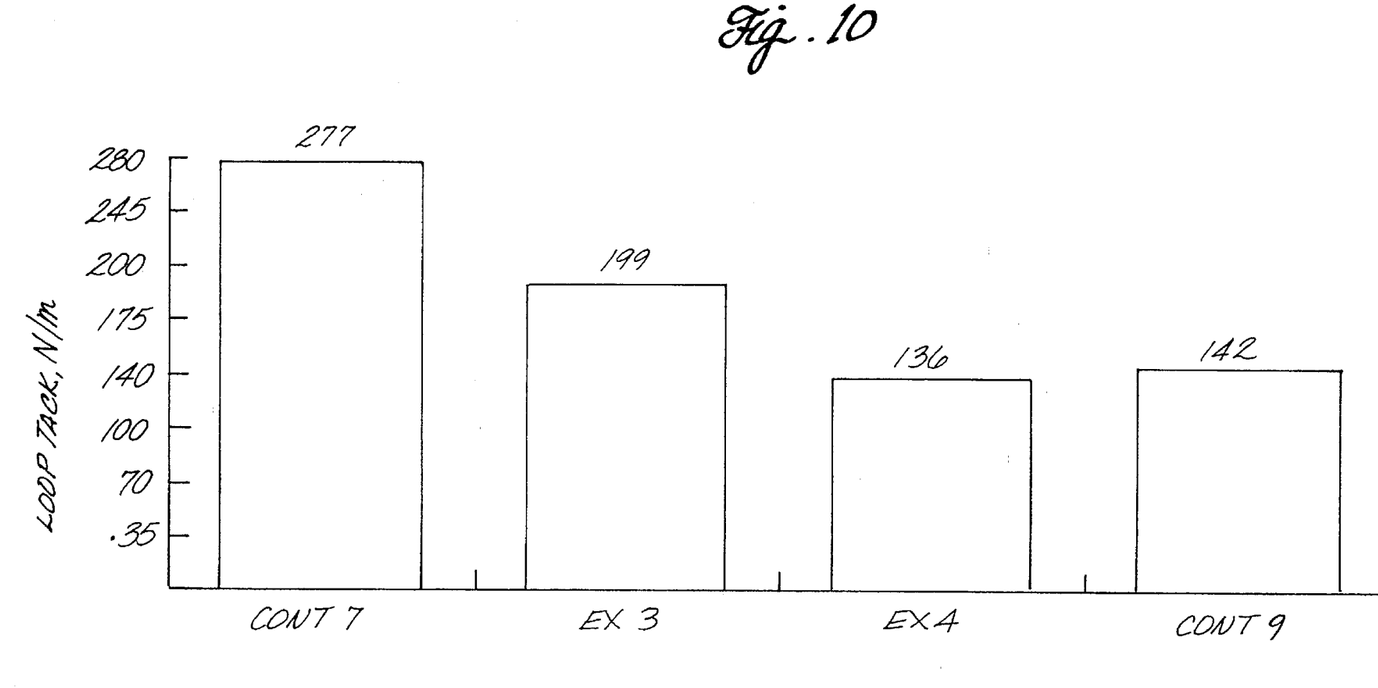
Figure 11:
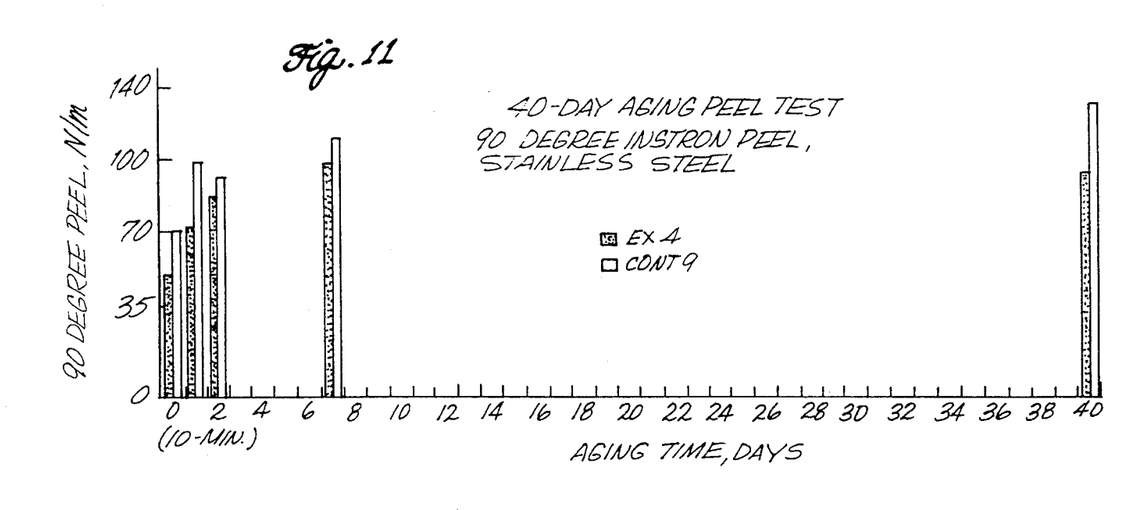
FIG. 11 shows 90° adhesion to steel for the composition of Example 4 and Control 9 as a function of time.
Figure 12:
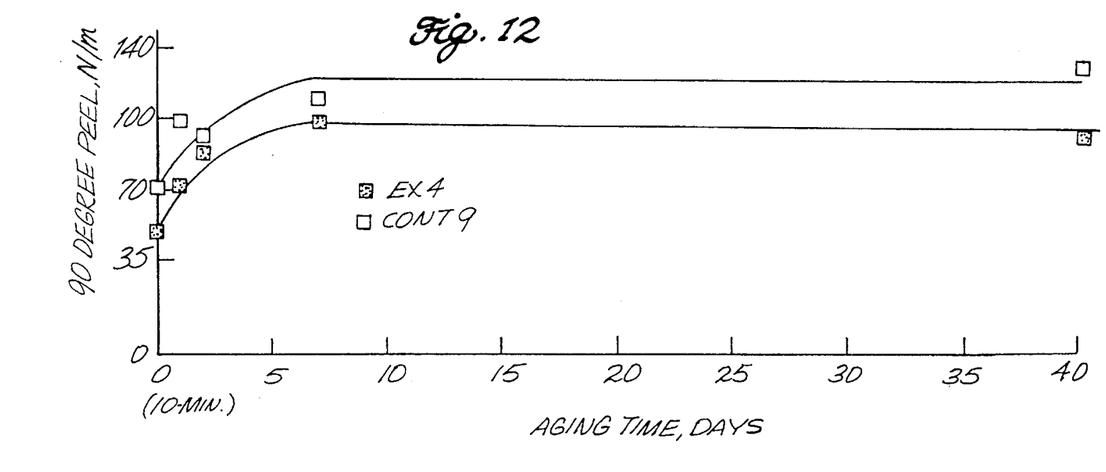
FIG. 12 is another plot of the information as contained in FIG. 11.

A study was made to show the effect of coat weight ratios of permanent pressure-sensitive adhesive to removable pressure-sensitive adhesive where the total coat weight was about 21 gsm. For purposes of the evaluation, there was used as the release liner a silicone-coated release liner manufactured and sold by Rhinelander. With reference to Table 2, Control 6, for this purpose, was a construction where the only adhesive used was the permanent adhesive P-2. Control 7 was formed using a dual die but at a low coat weight of removable pressure-sensitive adhesive. The coat weight of the permanent pressure-sensitive adhesive to removable pressure-sensitive adhesive was 14:7. The thickness of the removable pressure-sensitive adhesive was too low for the product to be a removable but this shows the ability to select adhesion by varying the relative coat weights of removable to permanent pressure-sensitive adhesives. For Control 8 only the permanent pressure-sensitive adhesive was applied to the high-gloss paper. Control 9 was a commercial removable single die coated removable pressure-sensitive adhesive on primed high-gloss paper. Examples 3 and 4 provide the ratio of coatings of adhesive R-3 on permanent P-2 applied to high-gloss paper at relative coat weights of 10.5 to 10.5 gsm, and 17 to 4 gsm. Table 2 shows peel and loop values to stainless steel. Attached FIG. 9 shows in block diagram the relative adhesion of the dual die-coated constructions of Control 7 and Examples 3 and 4 and Control 9 to stainless steel, the test being a 10-minute 90° peel, while FIG. 10 shows loop tack for the same constructions. It is clear that the construction closest to Control 9 was that where the total level of removable was 17 gsm and the permanent 4 gsm, i.e. Example 4. Table 3 compares the 90° peel after 40 days of aging on stainless steel for the composition of Example 4 as compared to Control 9. The same data is also plotted in FIGS. 11 and 12. It is clear that the construction of Example 4 tracks well with the construction of Control 9.

While the invention has been illustrated in terms of a single layer of a permanent pressure-sensitive adhesive and a single layer of a removable pressure-sensitive adhesive, it will be appreciated that any given layer may be a composite of several layers or mixtures of emulsion polymers so long as one effectively acts as a permanent pressure-sensitive adhesive and the other as a removable pressure-sensitive adhesive.

TABLE 2

10-Minute Peel Test and Loop Tack Tests
Substrate: Stainless Steel

| | Construction | | Test Results | |
|---|---|---|---|---|
| Sample # | R-3 (ct. wt. gsm) | P-2 (ct. wt. gsm) | 10-Min. Peel (N/M) | Loop Tack (N/M) |
| Control 6 | 0 | 23 | — | 497 |
| Control 7 | 7 | 14 | 125 | 278 |
| Example 3 | 10.5 | 10.5 | 79.9 | 198 |
| Example 4 | 17 | 4 | 53 | 136 |
| Control 8 | 21 | 0 | 44 | — |
| Control 9 | commercial removable | | 44 | 142 |

TABLE 3

| | Aging Time (days) | | | | |
|---|---|---|---|---|---|
| Construction | 0 (10 min.) | 1 | 2 | 7 | 40 |
| | Peel Strength (N/M) | | | | |
| Example 4 | 59 | 82 | 97 | 113 | 108 |
| Control 9 | 80 | 114 | 106 | 124 | 140 |

What is claimed is:

1. A removable pressure-sensitive adhesive construction comprising:

(a) a backing;

(b) a layer of a permanent pressure-sensitive adhesive in direct contact with a surface the backing, (c) a layer of removable pressure-sensitive adhesive in direct contact with the layer of permanent pressure-sensitive adhesive, and (d) a release surface in direct contact with the layer removable pressure-sensitive adhesive, said removable pressure-sensitive adhesive being present at a coat weight of at least about 50% by weight of the total coat weight and in which the coat weight ratio of the removable pressure-sensitive adhesive to permanent pressure-sensitive adhesive is at least 1:1, and the combination of said adhesive layers having a total coat weight of about 18 to 25 gsm.

2. A construction as claimed in claim 1 in which the release surface is provided by a release liner.

3. A construction as claimed in claim 1 in which the release surface is provided on a surface of the backing opposed to the surface in contact with the permanent pressure-sensitive adhesive.

4. A construction as claimed in claim 1 in which the coat weight ratio of removable pressure-sensitive adhesive to permanent pressure-sensitive adhesive is at least about 3:1.

5. A construction as claimed in claim 1 in which the coat weight ratio of removable pressure-sensitive adhesive to permanent pressure-sensitive adhesive is at least about 4:1.

6. A construction as claimed in claim 1 in which the permanent pressure-sensitive adhesive and removable pressure-sensitive adhesive layers are layers of acrylic pressure-sensitive adhesives co-deposited from aqueous emulsions.

7. A construction as claimed in claim 3 in which the permanent pressure-sensitive adhesive and removable pressure-sensitive adhesive layers are layers of acrylic pressure-sensitive adhesives co-deposited from aqueous emulsions.

8. A construction as claimed in claim 4 in which the permanent pressure-sensitive adhesive and removable pressure-sensitive adhesive layers are layers of acrylic pressure-sensitive adhesives co-deposited from aqueous emulsions.

9. A construction as claimed in claim 5 in which the permanent pressure-sensitive adhesive and removable pressure-sensitive adhesive layers are layers of acrylic pressure-sensitive adhesives co-deposited from aqueous emulsions.

\* \* \* \* \*